United States Patent
Schuck et al.

(10) Patent No.: US 9,854,212 B2
(45) Date of Patent: Dec. 26, 2017

(54) HIGH DYNAMIC RANGE PROJECTION WITH MULTIPLE NUMERICAL APERTURE ILLUMINATION

(71) Applicant: RealD Inc., Beverly Hills, CA (US)

(72) Inventors: Miller H. Schuck, Erie, CO (US); Peter Lude, Beverly Hills, CA (US); David A. Coleman, Louisville, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 15/251,875

(22) Filed: Aug. 30, 2016

(65) Prior Publication Data

US 2017/0064269 A1    Mar. 2, 2017

Related U.S. Application Data

(60) Provisional application No. 62/212,076, filed on Aug. 31, 2015.

(51) Int. Cl.
*H04N 9/31* (2006.01)
*G02B 27/28* (2006.01)
(Continued)

(52) U.S. Cl.
CPC ......... *H04N 9/3152* (2013.01); *G02B 27/283* (2013.01); *G03B 21/2066* (2013.01);
(Continued)

(58) Field of Classification Search
CPC .................................................. H04N 9/3105
(Continued)

(56) References Cited

U.S. PATENT DOCUMENTS

| 5,756,981 A * | 5/1998 | Roustaei | G03F 7/705 |
| | | | 235/462.07 |
| 6,488,379 B2 | 12/2002 | Kane | |

(Continued)

FOREIGN PATENT DOCUMENTS

| JP | H10-153738 A | 6/1998 |
| WO | 2013010167 A3 | 1/2013 |

OTHER PUBLICATIONS

International search report and written opinion of international searching authority in co-pending PCT/US2016/049494, dated Nov. 21, 2016.
(Continued)

*Primary Examiner* — Paulos M Natnael
(74) *Attorney, Agent, or Firm* — Penny L. Lowry; Neil G. Mothew (57) ABSTRACT

A projection system includes first and second illumination sources and a homogenizer component. The first illumination source has a first numerical aperture value. The second illumination source has a second numerical aperture value lower than the first numerical aperture value. The homogenizer component on the illumination path is configured to receive light from both the first and second illumination sources. A projection lens in the imagining path is configured to receive an image data stream that includes a sequence of image frames having an image frame period. The first and second illumination sources are configured for modulation at a rate equivalent to the image frame period. One or more active irises may perform the modulation.

24 Claims, 9 Drawing Sheets

(51) Int. Cl.
*G03B 21/20* (2006.01)
*H04N 13/04* (2006.01)

(52) U.S. Cl.
CPC ......... *H04N 9/3167* (2013.01); *H04N 9/3179* (2013.01); *H04N 9/3197* (2013.01); *H04N 13/0459* (2013.01)

(58) Field of Classification Search
USPC .................................. 348/750, 756, 804, 445
See application file for complete search history.

(56) References Cited

U.S. PATENT DOCUMENTS

| | | | |
|---|---|---|---|
| 6,910,774 B2* | 6/2005 | Troyer ................. | G03B 21/006 348/E9.026 |
| 7,220,006 B2 | 5/2007 | Allen et al. | |
| 7,387,389 B2* | 6/2008 | Gupta .................... | G03B 21/26 348/445 |
| 7,857,455 B2 | 12/2010 | Cowan et al. | |
| 7,905,602 B2 | 3/2011 | Schuck et al. | |
| 8,727,536 B2 | 5/2014 | Schuck et al. | |
| 8,937,651 B2 | 1/2015 | Guissin et al. | |
| 9,244,287 B2 | 1/2016 | Schuck et al. | |
| 2014/0240677 A1* | 8/2014 | Hu ......................... | G02B 27/14 353/30 |
| 2015/0138508 A1* | 5/2015 | Sharp .................... | G02F 1/0136 353/20 |
| 2016/0334696 A1* | 11/2016 | Schuck .............. | G02B 13/0095 |

OTHER PUBLICATIONS

Pavlovych et al., "A High-Dynamic Range Projection System," Photonic Applications in Biosensing and Imaging, SPIE vol. 5969 (2005).

Seetzen et al., "High dynamic range display systems," Siggraph, ACM Transactions on Graphics, 23(3), (2004), printed from: http://www.cs.ubc.ca/labs/imager/tr/2004/Seetzen_2004_HDR/.

Murdoch et al, "Veiling glare and perceived black in high dynamic range displays," Opt. Soc. Am. A, vol. 29, No. 4, Apr. 2012.

Seetzen et al, "A high dynamic range display using low and high resolution modulators,", SID International Symposium Digest, paper 54.2.

D. S. Dewald et al. in a White paper from Texas Instruments, Inc., Plano, TX ,"Advances in Contrast Enhancement or DLP Projection" Jun. 6, 2002.

* cited by examiner

HIGH DYNAMIC RANGE PROJECTION WITH MULTIPLE NUMERICAL APERTURE ILLUMINATION

TECHNICAL FIELD

This disclosure relates generally to high dynamic range (HDR) optical systems, and more particularly to HDR projection with multiple numerical aperture illumination.

BACKGROUND

Dynamic range describes the ratio of maximum-to-minimum luminance detected by a sensor, for example the eye, or presented by a display, for example a projector. The long-term dynamic range of the human eye spans many orders of magnitude, and exceeds the dynamic range of typical projection systems. The instantaneous dynamic range of the human eye is limited by intra-ocular reflections and scattering ("Veiling glare and perceived black in high dynamic range displays," M. Murdoch and I. Heynderickx, J. Opt. Soc. Am. A, Vol. 29, No. 4, April 2012); yet this often exceeds the instantaneous dynamic range of a projector.

BRIEF SUMMARY

Disclosed herein are embodiments of a projection system having an illumination path and an imaging path. The projection system may include a first illumination source having a first numerical aperture value, and a second illumination source having a second numerical aperture value lower than the first numerical aperture value. The projection system may also include a homogenizer component in the illumination path that is configured to receive light from both the first illumination source and the second illumination source. The projection system may also include a projection lens in the imaging path that is configured to receive an image data stream. The image data stream may comprise a sequence of image frames having an image frame period. The first and second illumination sources may be configured for modulation at a rate equivalent to the image frame period. The modulation may be uniform or non-uniform. The modulation may be intensity modulation, area modulation, or both. The modulation may be based on an electronic preview of an image frame, metadata associated with an image frame, or both.

Also disclosed herein are embodiments of a polarization conversion system. The polarization conversion system may include a first illumination source having a first numerical aperture value, and a second illumination source having a second numerical aperture value lower than the first numerical aperture value. The projection system may also include a homogenizer component in the illumination path that is configured to receive light from both the first illumination source and the second illumination source. The polarization conversion system may also include a first lens system on an initial light path. The first lens system may be configured to receive light from the homogenizer component. The polarization conversion system may also include a light splitting element configured to receive randomly polarized image light from the first lens system, to direct light with a first polarization state along a first light path, and to direct light with a second polarization state along a second light path. The polarization conversion system may also include a reflecting element located on the second light path and configured to receive light from the light splitting element. The polarization conversion system may also include a polarization rotator element located on the second light path and configured to receive reflected light from the reflecting element.

The polarization conversion system may also include a second lens system configured to receive an image data stream on the first light path from the light splitting element. The image data stream may comprise a sequence of image frames having an image frame period. The polarization conversion system may also include a third lens system configured to receive the image data stream on the second light path from the polarization rotator element. The first and second illumination sources may be configured for modulation at a rate equivalent to the image frame period. The modulation may be uniform or non-uniform. The modulation may be intensity modulation, area modulation, or both. The modulation may be based on an electronic preview of an image frame, metadata associated with an image frame, or both.

In some embodiments, the projection system and/or the polarization conversion system may include one or more active irises located on any or all of the light paths to perform some or all of the modulation of the light sources. For example, an active iris may be deployed at a pupil position in an illumination path relay, at a pupil position in an imaging path relay, and/or in a projection lens.

BRIEF DESCRIPTION OF THE DRAWINGS

Embodiments are illustrated by way of example in the accompanying figures, in which like reference numbers indicate similar parts, and in which.

DETAILED DESCRIPTION

Dynamic range describes the ratio of maximum-to-minimum luminance detected by a sensor, for example the eye, or presented by a display, for example a projector. The long-term dynamic range of the human eye spans many orders of magnitude, and exceeds the dynamic range of typical projection systems. The instantaneous dynamic range of the human eye is limited by intra-ocular reflections and scattering (as generally discussed in "Veiling glare and perceived black in high dynamic range displays," M. Murdoch and I Heynderickx, J. Opt. Soc. Am. A, Vol. 29, No. 4, April 2012); yet this often exceeds the instantaneous dynamic range of a projector. For higher perceived image quality, it is desirable to implement display devices with dynamic ranges approaching the limits of the human eye.

In projection systems, the dynamic range can be described on a longer-term frame-to-frame basis, which may be referred to as inter-frame or sequential contrast, and on an instantaneous single-frame basis, which may be referred to as intra-frame, checkerboard, or ANSI contrast.

The sequential contrast of a projection device may be determined by displaying a full-frame white image, measuring its luminance, and comparing it to the luminance of a full-frame black image. Typical sequential contrast ratios for digital cinema projectors are 2000:1. The sequential contrast of projection displays may be limited by the leakage of light from the illumination optics into the imaging optics when the display panel is in the dark state. For Digital Light Processing (DLP)-based projectors, this includes light reflected from the mirror hinges and edges, light scattered from glass materials, surfaces and coatings, and light reflecting or scattering from mechanical features. For Liquid Crystal on Silicon (LCOS)-based systems, this includes light leakage due to imperfect polarization states and similar interactions between light, glass and mechanical features as in the DLP system. Since the leakage from the panel dark state represents the lowest light output of the projector, the projector's sequential contrast is, in most cases, about equal to the projector's dynamic range.

Intra-frame contrast, which may be referred to as checkerboard or ANSI contrast, may be determined by locating equal sized black and white rectangles or squares within a single frame, and measuring the ratio of luminance in the white rectangles relative to the black rectangles. The intra-frame contrast is generally lower than sequential contrast, as multiple reflections and scattering of light from the white rectangles adds to the sequential leakage in the dark rectangle areas. Disregarding light reflected from various theater surfaces, such as walls, seats, and patrons, typical intra-frame contrast ratios for digital cinema projectors can vary from 100:1 to 500:1, depending on the cleanliness and quality of the imaging optics.

For images with high luminance pixels, intra-frame contrast may limit the perceived quality of the projected image. Light from the bright pixels tends to pollute the dark areas or leak into the dark areas. For images with low luminance pixels, the sequential leakage may limit the perceived image quality. Stated differently, variations in the image black levels may be "crushed" or reduced to unnoticeable differences.

Figure 1:
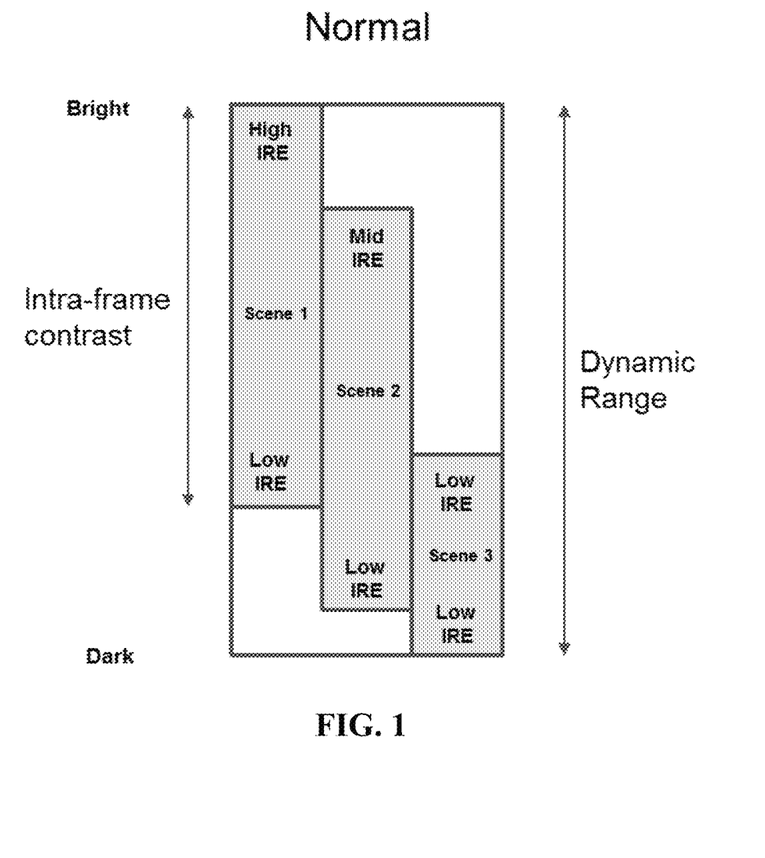
FIG. 1 is a schematic diagram illustrating the dynamic range and intra-frame contrast for a typical projector.

FIG. 1 depicts the dynamic range and intra-frame contrast for a typical projector. As illustrated in FIG. 1, intra-frame contrast or within-frame contrast may have high IRE pixels and in this example, the intra-frame contrast may lower the quality of the projected frame. Additionally, the dynamic range may have low IRE pixels and in this example, the HDR or frame-to-frame contrast may lower the quality of the sequentially projected frames.

In an effort to improve dynamic range and intra-frame contrast, an optical device can be inserted into the projector optical path to more precisely control the illumination reaching the screen. The optical device may work in concert with signal conditioning of the input data to improve dynamic range and intra-frame contrast while maintaining the artistic intent of the content. Examples include U.S. Pat. No. 7,220,006 to Allen et al., and "A High-Dynamic Range Projection System," by A. Pavlovych and W. Stuerzlinger, Photonic Applications in Biosensing and Imaging, SPIE vol. 5969, ISBN 081945988-7, September 2005.

Such an optical device may be located at one or more of several points in a projection system: 1) at or near a field position, for example at the display or a conjugate image plane of the display; 2) at or near a pupil position, for example in the illumination optics or relay and/or projection lens aperture stops; or 3) at or near a position between a field and a pupil, for example, outside the exit surface of a projection lens. An optical device placed at or near a field position operates spatially on the image, either as a global modulation of the entire image or as a pixelated modulation of the image. For pupil position implementation, an optical device typically operates globally on the entire image by reducing the amount of light through the pupil at appropriate times. Devices located between pupil and field positions may account for both the angular and spatial nature of the unformed image.

A system described in "A High-Dynamic Range Projection System," by A. Pavlovych and W. Stuerzlinger ("A high-dynamic range projection system," by A. Pavlovych and W. Stuerzlinger, www.cs.yorku.ca/~{andriyp, wolfgang}) locates a modulator, in this case, a liquid-crystal display (LCD), at a field position. The field position is an intermediate image plane generated by adding a relay lens after a projection lens. The relay forms a real image of a DLP panel at or near the LCD. An objective follows the LCD to re-project the image to the screen. The LCD absorbs a large portion of the unpolarized light from the projector, and is therefore inefficient (for example, approximately 15% transmissive).

A system described in "High dynamic range display systems," by H. Seetzen et al., ("High dynamic range display systems," by H. Seetzen et al., Siggraph 2004, ACM Transactions on Graphics, 23(3)), utilizes a projector as a backlight for an LCD. The projector provides a high brightness image, with similar resolution to the LCD, but slightly defocused to avoid moire issues, while the LCD provides a second stage of modulation. The dynamic range is reported to be the multiplication of the projector contrast and LCD contrast. In this case, the modulator is the projected real image and is located at a field position, for example the image plane. In order to account for the slightly blurred projector image, the authors convolved the projector pixel blur function with the square root of the linear image, and divided the LCD panel image by this convolution to account for the blur.

Seetzen et al. also describes an LED-backlight HDR display in "A high dynamic range display using low and high resolution modulators" ("A high dynamic range display using low and high resolution modulators," by H. Seetzen et al., SID International Symposium Digest, paper 54.2). In this case, the authors generally describe a low resolution backlight that includes high brightness LEDs arranged in an array. The LEDs are current and pulse controlled to serve as the modulator. In this case, the modulator is located at a field, or image, position.

Reducing the size of the pupil in the illumination and/or projection optics can also increase projector sequential contrast, with the detrimental effect of reducing overall light throughput. Reducing the pupil size can also improve the intra-frame contrast of a projection system, down to a pupil size where the resolution of the image becomes limited not by the aberrations present in the lens, but rather by the diffraction limit of the optical system.

Figure 2:
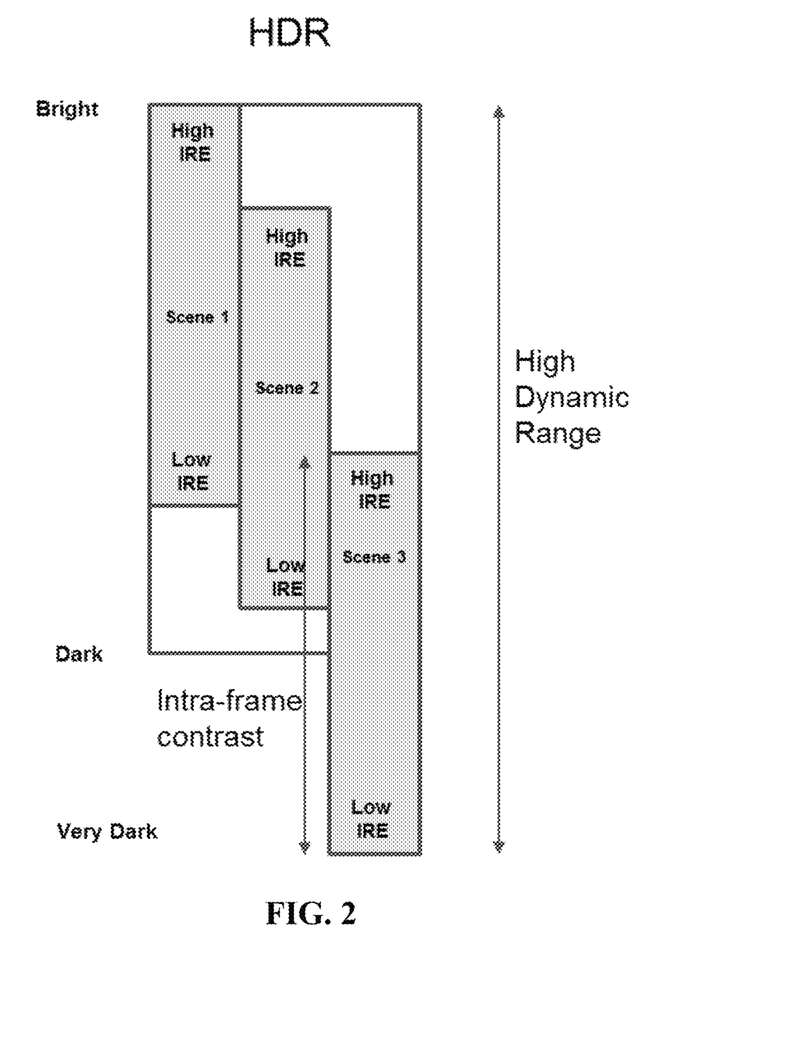
FIG. 2 is a schematic diagram illustrating the dynamic range, intra-frame contrast, and pixel addressing for an HDR projector.

U.S. Pat. No. 7,220,006 to Allen et al., is a pupil position system, and utilizes an adjustable iris at the projection lens aperture stop to increase the sequential contrast, and therefore long-term dynamic range, of a projector. The iris size is adjusted based on the peak or average pixel luminance measured in an image frame, while the code values, or IRE, which determine the pixel luminance, are re-adjusted to account for the lowered lens throughput. This sort of "global" modulation can improve the intra-frame contrast at low light levels, while extending the non-instantaneous overall system dynamic range. FIG. 2 depicts the dynamic range, intra-frame contrast, and pixel addressing for such an HDR projector.

Polarization-preserving stereoscopic cinema systems have been described in several patents and patent applications, for example, U.S. Pat. No. 7,905,602, U.S. Pat. No. 7,857,455, U.S. Pat. No. 8,727,536, and WO 2013010167A3, all of which are herein incorporated by reference in their entireties. Randomly polarized light from a DLP projector may be split into orthogonal polarization states, re-directed and manipulated to produce matching polarization states, and overlaid on-screen for viewing. These systems may actively switch polarization states, for example with liquid-crystal switches, or use passive components in dual projector configurations, for example with one projector per eye. Once the randomly polarized light is sorted into orthogonal polarization states, there is an opportunity to locate polarization-based modulators in the optical path(s) to efficiently modulate light.

Several types of HDR devices for use in several types of projection systems are described in U.S. Patent Publ. No. 2015/0138508 entitled "High dynamic range, high contrast projection systems," filed Nov. 14, 2014 and in U.S. patent application Ser. No. 15/151,376 entitled "High dynamic range, high contrast projection systems," filed May 10, 2016, which are herein incorporated by reference in their entireties.

Figure 3:
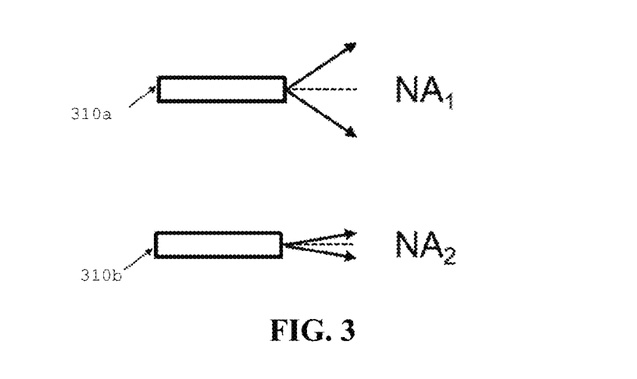
FIG. 3 is a schematic diagram illustrating multiple illumination sources with differing numerical aperture values, in accordance with the present disclosure.

Described herein are devices and systems for projection utilizing multiple sources of illumination with two or more numerical aperture (NA) values. The illumination sources may be modulated in time on the order of a frame period to improve the instantaneous dynamic range of the projected image as generally illustrated in FIG. 3. FIG. 3 is a schematic diagram illustrating multiple illumination sources 310 with differing NA values. The modulation of one or more of the multiple illumination sources 310 in intensity and/or area, either uniformly or non-uniformly, may be determined by electronically previewing the incoming image data, or by utilizing extra "metadata" in the image data stream.

Illumination sources 310 may include, but are not limited to, lasers, lamps, light-emitting diodes (LEDs), or excited phosphors, or any combination thereof. Illumination sources may also include lasers, lamps, LEDs or excited phosphors, or any combination thereof, coupled into optical fibers or waveguides. The optical fibers or waveguides may have differing acceptance NA values. The illumination sources may also include the above emitters coupled into a relay or telescopic lens arrangement to produce source images with differing NA values.

Figure 4:
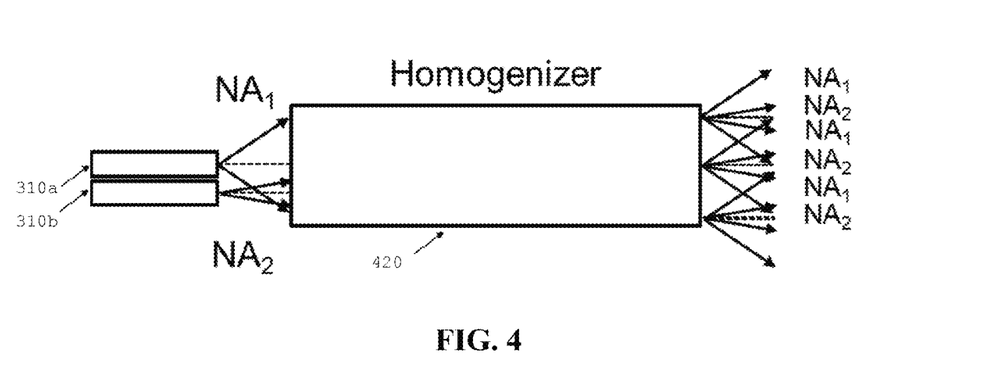
FIG. 4 is a schematic diagram illustrating multiple illumination sources with differing numerical aperture values illuminating a homogenizer component, in accordance with the present disclosure.

The multiple illumination sources 310 may illuminate a homogenizer component 420, such as a light pipe or light tunnel, as illustrated in FIG. 4. FIG. 4 is a schematic diagram illustrating two illumination sources 310 with differing NA values and a homogenizer component 420. The homogenizer component 420 may be, for example, a tapered light pipe or tunnel, or a non-imaging optical element such as a compound parabolic concentrator or fly's-eye array.

Figure 5:
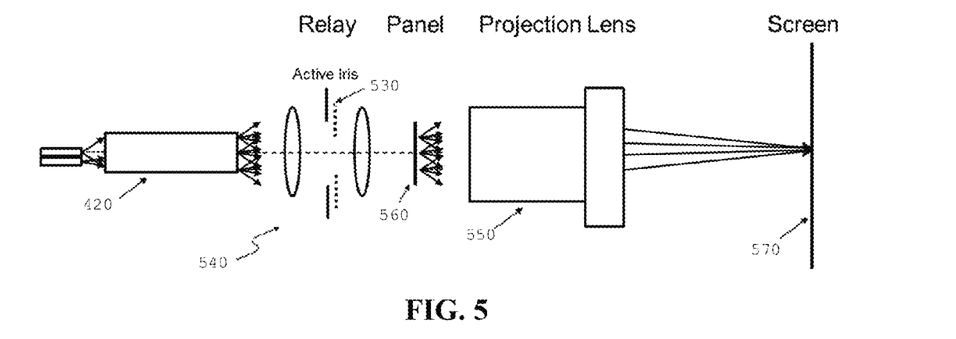
FIG. 5 is a schematic diagram illustrating a projection system including multiple illumination sources with differing numerical aperture values illuminating a homogenizer component and further including an active iris deployed in an illumination path relay, in accordance with the present disclosure.

Additionally, the illumination sources may be coupled with one or more active irises, which may change aperture diameter in continuous or discrete steps, in a time on the order of a frame period as illustrated in FIG. 5. FIG. 5 depicts a projection system including two illumination sources 310 with differing numerical aperture values illuminating a homogenizer component 420 and further including an active iris 530 deployed in an illumination path relay 540. The illumination relay 540 contains an active iris 530 at the pupil position. Further, a projection lens 550 images the panel 560 to the screen 570.

Figure 6:
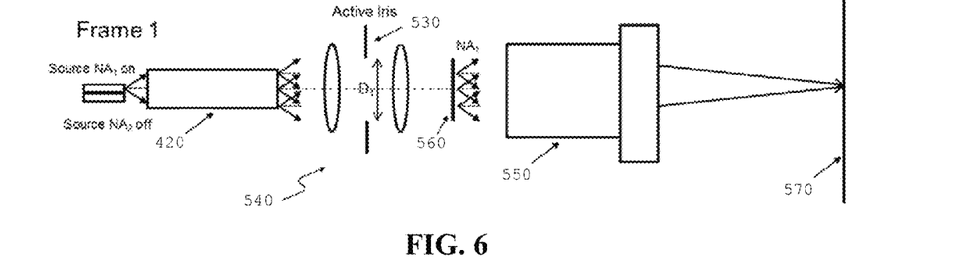
FIG. 6 is a schematic diagram illustrating the projection system of FIG. 5 processing a first frame in an image data stream, in accordance with the present disclosure.

The modulation of one or more of the illumination sources 310 and the size of the active iris 530 aperture (or apertures when multiple active irises are present) may be determined by electronically previewing the incoming image data, or by utilizing extra "metadata" in the image data stream. For example, for image frames with high average luminance, illumination sources 310 with higher NA values may be turned on to fill the full projection aperture, while illumination sources 310 with lower NA values may be turned off as illustrated in FIG. 6. FIG. 6 depicts the projection system of FIG. 5 processing a first frame in an image data stream. The illumination source 310a is turned on, while the illumination source 310b, which has an NA value lower than illumination source 310a, may be turned off. Further, the aperture D1 of the active iris 530 may be fully open. This would be a typical operation for an image frame with a high average luminance, and results in a standard dynamic range image.

Figure 7:
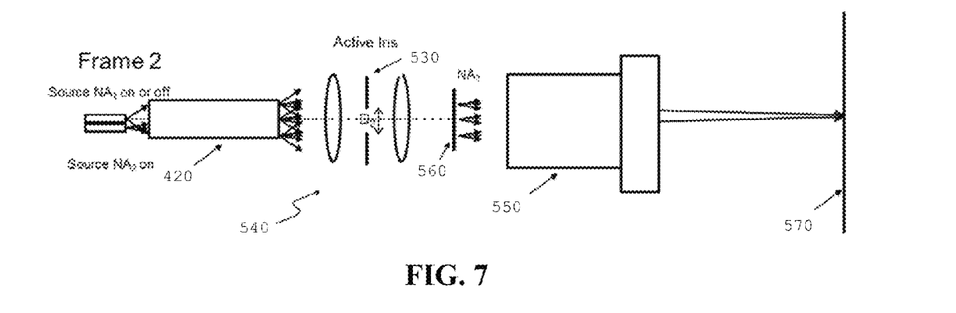
FIG. 7 is a schematic diagram illustrating the projection system of FIG. 5 processing a second frame in an image data stream, in accordance with the present disclosure.

FIG. 7 depicts the projection system of FIG. 5 processing a second frame in an image data stream. For image frames with lower average luminance but having small areas with high luminance, for example an image of stars in a dark sky, all illumination sources 310 may be turned on and the aperture D2 of the active iris 530 may be stopped down. The higher NA value illumination source(s) 310a provide the bulk of the illumination, while the addition of the lower NA value source(s) 310b provide additional illumination for the highlights. For some image frames, some or all of the higher NA value illumination sources 310a may be turned off.

Figure 8:
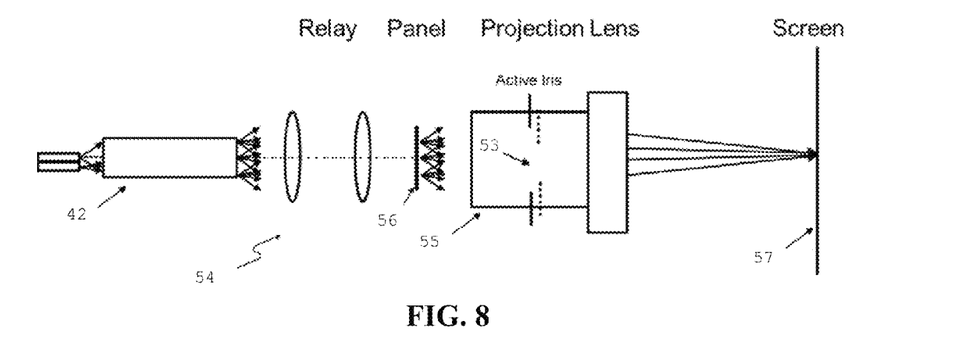
FIG. 8 is a schematic diagram illustrating a projection system including multiple illumination sources with differing numerical aperture values illuminating a homogenizer component and further including an active iris deployed in a projection lens, in accordance with the present disclosure.
Figure 9:
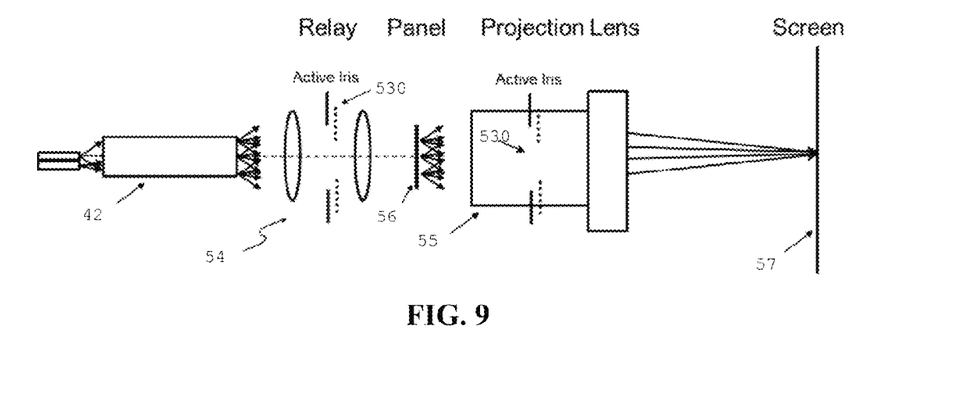
FIG. 9 is a schematic diagram illustrating a projection system including multiple illumination sources with differing numerical aperture values illuminating a homogenizer component and further including a first active iris deployed in an illumination path relay and a second active iris deployed in a projection lens, in accordance with the present disclosure.
Figure 10:
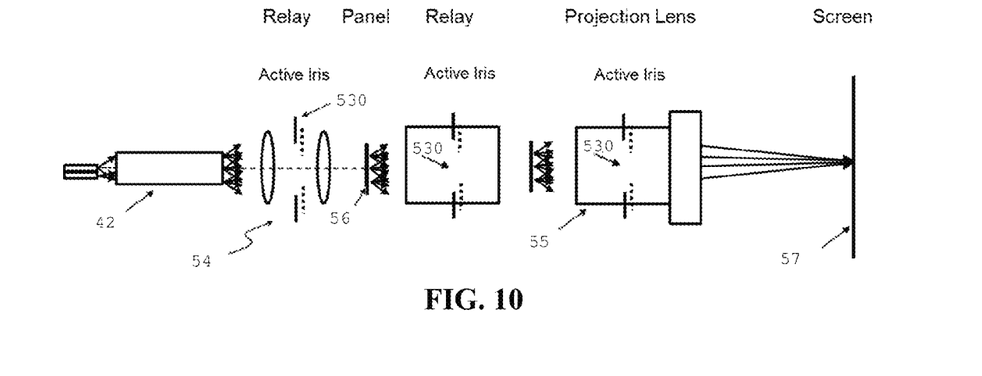
FIG. 10 is a schematic diagram illustrating a projection system including multiple illumination sources with differing numerical aperture values illuminating a homogenizer component and further including a first active iris deployed in an illumination path relay, a second active iris deployed in an imaging path relay, and a third active iris deployed in a projection lens, in accordance with the present disclosure.

Active iris(es) may be deployed in the projector illumination path and/or the imaging path. In the illumination path, an active iris 530 may be deployed at a pupil position in a relay 540 as illustrated in FIG. 5. In the imaging path (after the panel 560), an active iris 530 may be deployed at a pupil position in a relay 1080 and/or projection lens 550 as illustrated in FIGS. 8, 9, and 10. FIG. 8 depicts a projection system including multiple illumination sources 310 with differing numerical aperture values illuminating a homogenizer component 420 and further including an active iris 530 deployed in a projection lens 550. FIG. 9 depicts a projection system including multiple illumination sources 310 with differing numerical aperture values illuminating a homogenizer component 420 and further including a first active iris 530a deployed in an illumination path relay 540 and a second active iris 530b deployed in a projection lens 550. FIG. 10 depicts a projection system including multiple illumination sources 310 with differing numerical aperture values illuminating a homogenizer component 420 and further including a first active iris 530a deployed in an illumination path relay 540, a second active iris 530c deployed in an imaging path relay 1080, and a third active iris 530b deployed in a projection lens 550. The multiple illumination sources 310 and active iris(es) 530 may also be implemented with polarization preserving optics for high efficiency 3D. The image data code values may also be adjusted to account for changes to the luminance levels due to the change in illumination source(s) and/or active iris aperture(s).

Alternatively, the multiple sources 310 with two or more NA values may be coupled with a secondary modulator (not illustrated), such as a DLP or LCOS panel, in the illumination path, where the secondary modulator is used to spatially modulate the light impinging on the primary image modulator, such as an active iris 530, and the lower NA value illumination source may be used to improve the brightness of highlights in the image, such as stars in a dark sky, without adding significantly to the background dark luminance.

Adjusting Code Values

The multiple NA value illumination sources and/or active iris(es) and/or secondary modulators may be modulated to work in concert with an adjustment in image code values, producing a higher dynamic range in the image. The modulation may be determined by the luminance intended in an image frame. The image luminance levels may be re-adjusted to allow darker projected black levels, and to account for any lowered throughput in brighter portions of the image.

In some embodiments, the luminance levels may be inversely scaled with the reduced luminance transmitted by the modulation. For a typical projection system, the luminance at each pixel in the image may be encoded according to a power-law expression, in which the code values are raised to a power other than 1, for example 2.6 in the digital cinema case. The following expression may determine the pixel luminance L for a code value CV, $$L = L_{max} \times \left(\frac{CV}{CV_{max}}\right)^\gamma$$

given the maximum allowable pixel luminance $L_{max}$, the maximum allowable code value $CV_{max}$, and the power-law exponent $\gamma$. If the modulation is adjusted such that one-half of the light is transmitted as before, then the throughput is said to have been reduced by one "stop". This reduction in throughput, $\alpha$, is a global modulation of the image, for example all or approximately all pixels may be reduced in luminance.

$$a = \frac{1}{2^{(no.\ stops)}}$$

$$L = a \times L_{max} \times \left(\frac{CV'}{CV_{max}}\right)^\gamma$$

In this example, the black levels become much darker, but the bright pixels also become darker. To compensate for this and to return the levels of the bright pixels back to their intended luminance, the code values in the image must be linearized (de-gamma), scaled by $1/\alpha$, and the power law must be reapplied (re-gamma), $$CV' = CV_{max} \times \left(\frac{L/a}{L_{max}}\right)^{\frac{1}{\gamma}}$$

Note that the higher pixel luminance in the image may be less than or equal to ($\alpha \times L_{max}$), otherwise clipping in bright areas of the image may occur. If some clipping is acceptable, the average luminance in the image may be used.

Figure 11A:
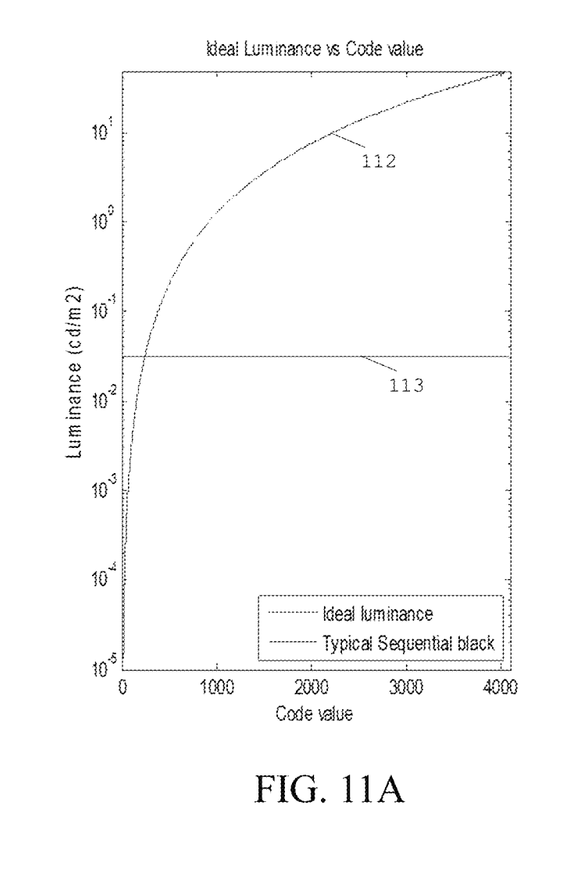
FIG. 11A is a schematic diagram illustrating an ideal luminance curve for code values in a 12-bit gray level system, in accordance with the present disclosure.
Figure 11B:
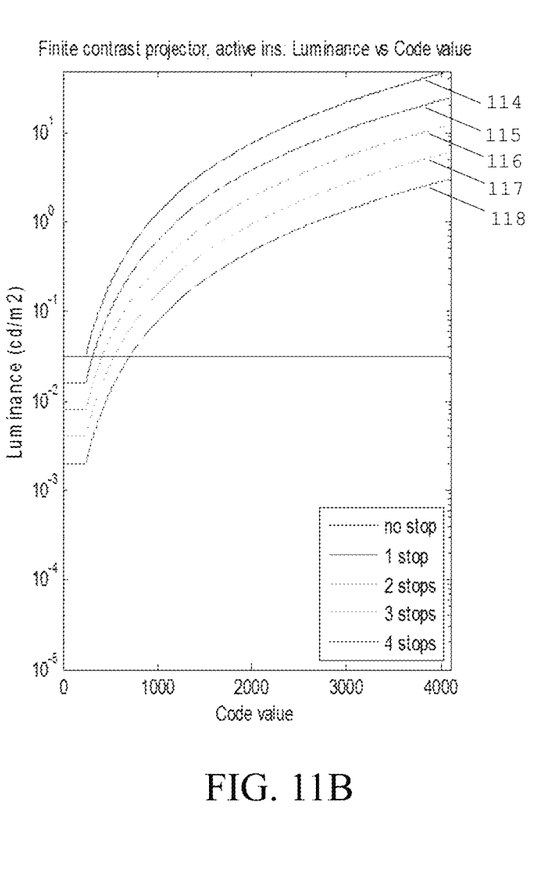
FIG. 11B is a schematic diagram illustrating luminance curves for a finite contrast projector with various stops of an active iris, in accordance with the present disclosure.

FIGS. 11A and 11B depict the effect of active iris modulation on image luminance. FIG. 11A depicts the ideal luminance curve 1120 (on a log scale) for code values in a 12-bit gray level system. The horizontal black line 1130 in FIG. 11A indicates the luminance level for a typical projector when projecting a fully black image (termed sequential black). Typical sequential contrast ratios for a DLP cinema projector are 2000:1. FIG. 11B depicts luminance curves for a finite contrast projector with various stops of modulation. Luminance levels below the black line are dark areas recovered in the image that were previously "crushed" by the sequential black level. The code values have been adjusted to CV' values; this makes a wider range of code values available for the same image. Interpolation of luminance values (for the higher range of code values) may be appropriate to reduce contouring effects in the final image. In FIG. 11B, the uppermost curve represents the "no stop" curve 1140, the next curve down is the "1 stop" curve 1150, the third curve down is the "2 stops" curve 1160, the fourth curve from the top is the "3 stops" curve 1170, and the bottom curve is the "4 stops" curve 1180.

If lower NA value source light, $\Delta L_{max}$, is added to the optical path, the code values can be adjusted according to $$CV'' = CV_{max} \times \left(\frac{L/a}{L_{max} + \Delta L_{max}}\right)^{\frac{1}{\gamma}}$$

This adjustment to the code values allows for higher luminance highlights to be displayed using the extra intensity from the lower NA value illumination source(s).

Figure 12A:
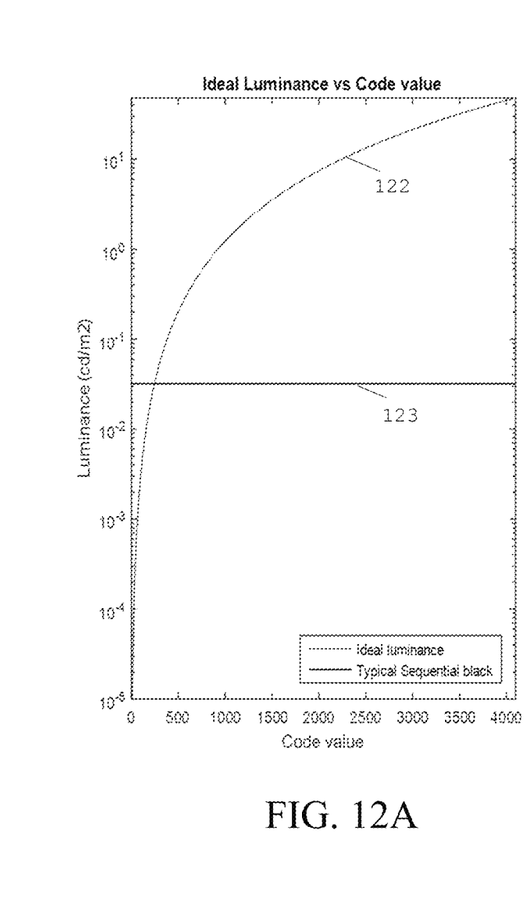
FIG. 12A is a schematic diagram illustrating an ideal luminance curve for code values in a 12-bit gray level system, in accordance with the present disclosure.
Figure 12B:
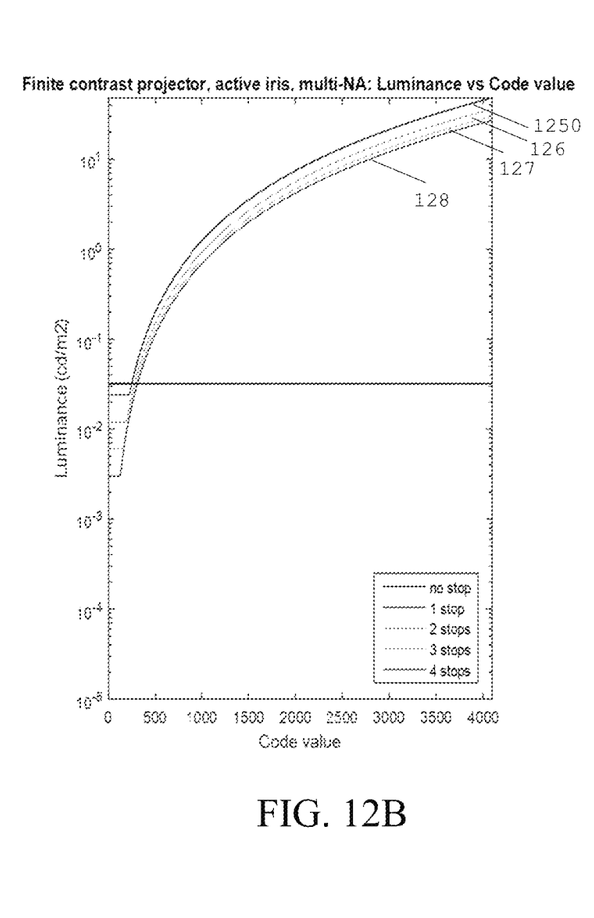
FIG. 12B is a schematic diagram illustrating luminance curves for a finite contrast projector with various stops of an active iris and additional low numerical aperture value illumination, in accordance with the present disclosure.

FIG. 12A is a schematic diagram illustrating an ideal luminance curve for code values in a 12 bit system. The horizontal line indicates the luminance level for a typical projector when projecting a fully black image, termed sequential black. FIG. 12B is a schematic diagram illustrating luminance levels for a finite contrast projector with various stops of modulation and additional low numerical aperture illumination. Luminance levels below the horizontal line are darks areas recovered in the image that were previously crushed by the sequential black level. Higher luminance levels are now achievable at the upper code values.

FIGS. 12A and 12B depict the effect of active iris modulation with the addition of lower NA value source light to the optical path on image luminance. FIG. 12A (identical to FIG. 11A) depicts the ideal luminance curve 1220 (on a log scale) for code values in a 12-bit gray level system. The horizontal black line 1230 in FIG. 12A indicates the luminance level for a typical projector when projecting a fully black image (termed sequential black). Typical sequential contrast ratios for a DLP cinema projector are 2000:1. FIG. 12B depicts luminance curves for a finite contrast projector with various stops of modulation and additional low numerical aperture illumination. Luminance levels below the horizontal line are dark areas recovered in the image that were previously "crushed" by the sequential black level. Higher luminance levels are now achievable at the upper code values. In FIG. 12B, the uppermost curve represents the "1 stop" curve 1250, the second curve down is the "2 stops" curve 1260, the third curve from the top is the "3 stops" curve 1270, and the bottom curve is the "4 stops" curve 1280.

Figure 13A:
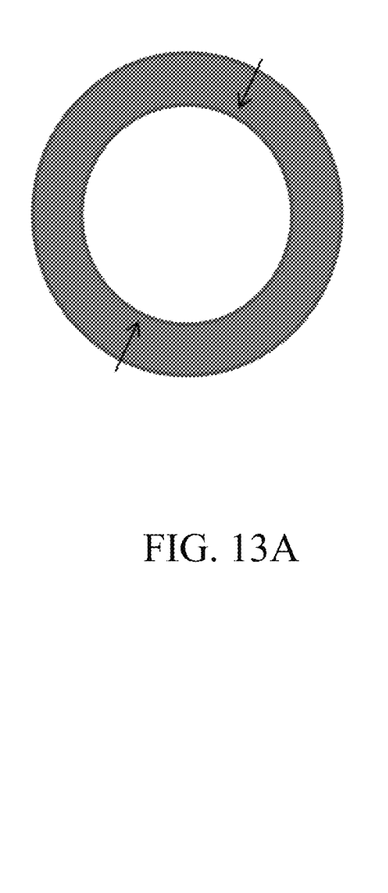
FIG. 13A is a schematic diagram illustrating an active iris shape, in accordance with the present disclosure.
Figure 13B:
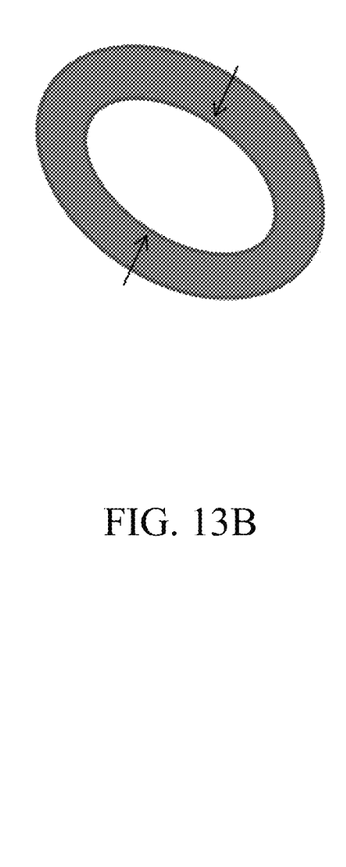
FIG. 13B is a schematic diagram illustrating an active iris shape, in accordance with the present disclosure.
Figure 13C:
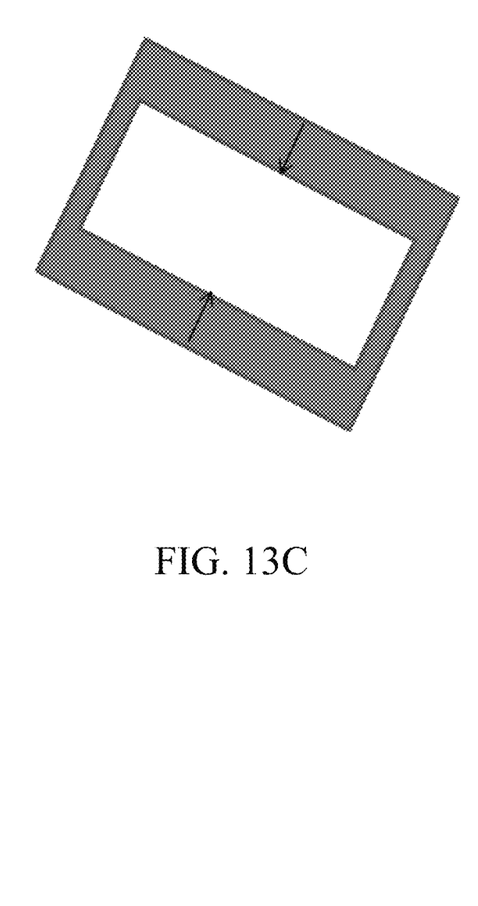
FIG. 13C is a schematic diagram illustrating an active iris shape, in accordance with the present disclosure.

FIGS. 13A, 13B, and 13C are schematic diagrams illustrating different example shapes for an active iris. FIGS. 13A, 13B, and 13C depict three of the many possible shapes for an active iris. An iris may be various shapes, but is not limited to, the shapes in FIGS. 13A, 13B, and 13C. As pictured from left to right, FIG. 13A depicts an approximately circular iris, FIG. 13B depicts an elliptical or cat-eye iris, and FIG. 13C depicts an approximately rectangular iris. The shape of an iris may be tilted and/or off-axis to better capture stray light from the DLP panel and illumination system, as generally discussed by D. S. Dewald et al. in a White paper from Texas Instruments, Inc., Plano, Tex., "Advances in Contrast Enhancement for DLP Projection" Jun. 6, 2002. Additionally, one or both sides of an elliptical or rectangular iris may be adjustable or moveable.

Stereoscopic 3D HDR Projection

The relay and projection lens systems with active iris depicted in FIGS. 5-10 may be applied to stereoscopic projection. For example, an actively-switched polarization system such as, but not limited to, a RealD ZScreen, may follow the lens system to encode stereoscopic imagery. Alternatively, a passive polarization system may follow the lens in the case where more than one projector is used to encode the imagery. A multi-wavelength approach may be utilized, in which narrow spectral bandwidths may be transmitted through the lens system, and decoded into left and right images with dichroic or thin film interference eyewear. The active iris may use provisions for determining the modulation values based on image data or metadata, and adjusting image luminance values.

Polarization-Preserving 3D HDR Projection

A global modulator may be included in a polarization-preserving stereoscopic projection system. Examples of such systems may include, but are not limited to, the RealD XL, RealD XLW, RealD XLDP, and RealD XLWDP products, as generally discussed in at least U.S. Pat. No. 7,905,602 and U.S. Pat. No. 7,857,455. The RealD XL product may be located after the exit surface of the projection lens, and may split the randomly polarized input light into orthogonal polarization states. The product may then re-direct and/or manipulate the light to produce approximately matching polarization states, and may overlay the two light paths on-screen for viewing. In one example, a relay and projection lens system with an HDR modulator may be located before the polarizing beam splitter (PBS) in the XL product, thus light entering the polarization modulators may be polarized and the system efficiency may remain high. Such a global modulator may be an active iris, for example an electro-mechanical iris with an adjustment response time on the order of a frame period.

Figure 14:
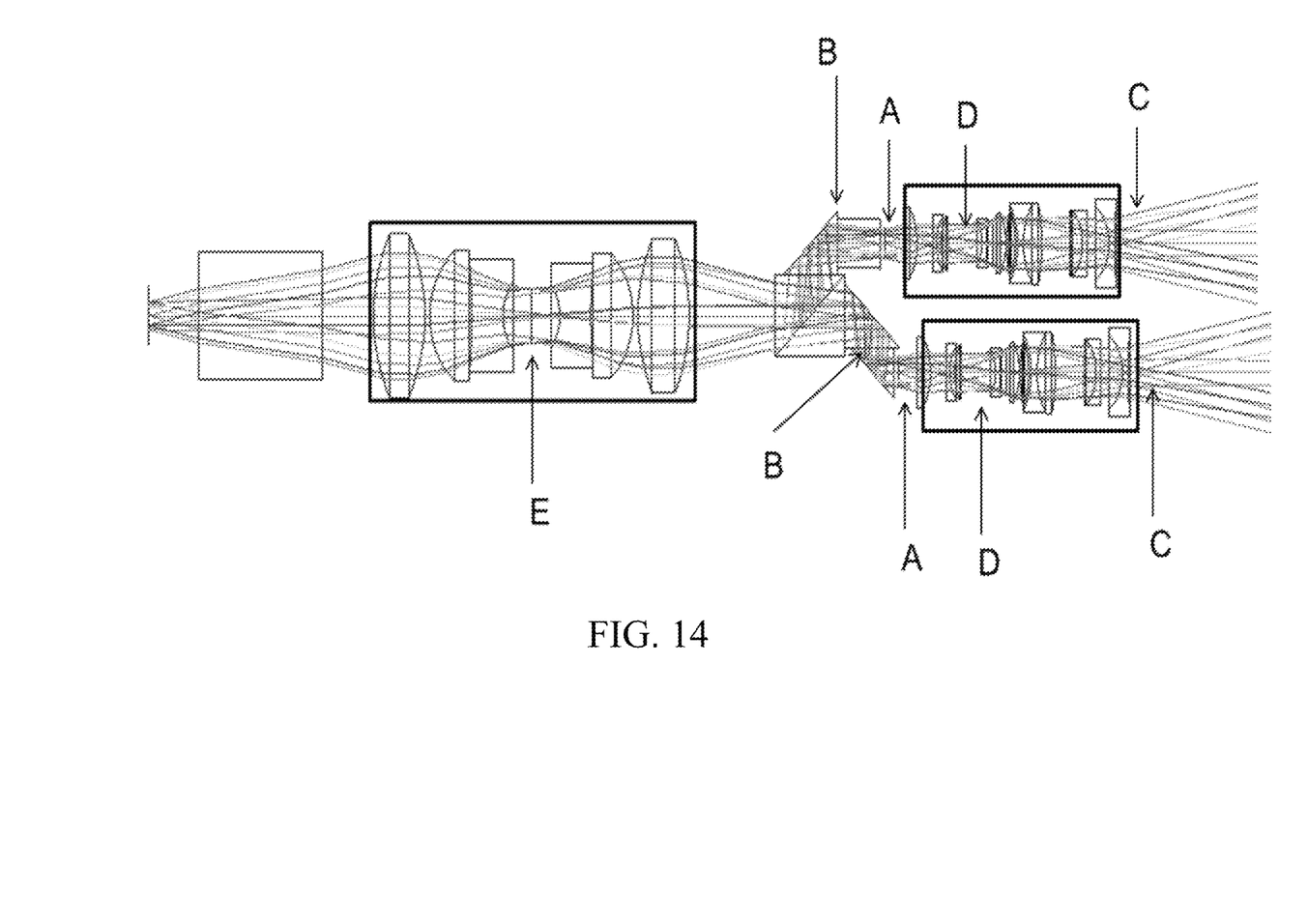
FIG. 14 is a schematic diagram illustrating an example polarization preserving stereoscopic system with HDR elements, in accordance with the present disclosure.

3D systems in which the polarization-preserving function may be located in the object conjugate of the projection lens is generally discussed in U.S. Pat. No. 9,244,287 entitled "Optical systems with compact back focal lengths," which is herein incorporated by reference in its entirety. In such cases, a relay lens creates a real intermediate image of the display, and a polarizing beam splitter and one or more reflecting surfaces direct approximately orthogonal polarization states to two projection lenses. FIG. 14 depicts such a system.

FIG. 14 is a schematic diagram illustrating HDR modulator location options for a polarization-preserving stereoscopic system. HDR modulators as discussed above may be located at locations D and E, near the aperture stop or pupil positions of the relay and/or projection lenses. Such an HDR modulator may be an active iris, for example, an electro-mechanical iris with an adjustment response time on the order of a frame period.

As may be used herein, the terms "substantially" and "approximately" provide an industry-accepted tolerance for its corresponding term and/or relativity between items. Such an industry-accepted tolerance ranges from zero to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A projection system having an illumination path and an imaging path, the projection system comprising:
   a first illumination source having a first numerical aperture value;
   a second illumination source having a second numerical aperture value lower than the first numerical aperture value;
   a homogenizer component in the illumination path, the homogenizer component configured to receive light from both the first and second illumination sources;
   a projection lens in the imaging path, the projection lens configured to receive an image data stream, the image data stream comprising a sequence of image frames having an image frame period, wherein the first and second illumination sources are configured for modulation at a rate equivalent to the image frame period; and
   an active iris configured to perform, at least in part, the modulation, wherein the active iris is deployed at a pupil position in an illumination path relay.

2. The projection system of claim 1, wherein the modulation is at least one of intensity modulation and area modulation.

3. The projection system of claim 1, wherein the modulation is based on an electronic preview of an image frame.

4. The projection system of claim 1, wherein the modulation is based on metadata associated with an image frame.

5. The projection system of claim 1, wherein the first and second illumination sources are configured for non-uniform modulation.

6. The projection system of claim 1, wherein the first illumination source includes at least one of a laser, a lamp, a light-emitting diode, and an excited phosphor.

7. The projection system of claim 6, wherein the first illumination source comprises components coupled into optical fibers or waveguides.

8. The projection system of claim 1, wherein the homogenizer component is selected from the group consisting of a light pipe, a light tunnel, a tapered light pipe, a tapered light tunnel, a compound parabolic concentrator, and a fly's eye array.

9. The projection system of claim 1, further comprising:
   a second active iris deployed in the imaging path, the second active iris configured to perform, at least in part, the modulation.

10. A polarization conversion system, comprising:
    a first illumination source having a first numerical aperture value;
    a second illumination source having a second numerical aperture value lower than the first numerical aperture value;
    a homogenizer component on an initial light path, the homogenizer component configured to receive light from both the first and second illumination sources;
    a first lens system on the initial light path, the first lens system configured to receive light from the homogenizer component;
    a light splitting element configured to receive light from the first lens system as randomly polarized image light, the light splitting element further configured to direct light with a first polarization state along a first light path, and further configured to direct light with a second polarization state along a second light path;
    a reflecting element located on the second light path and configured to receive light from the light splitting element;
    a polarization rotator element located on the second light path and configured to receive reflected light from the reflecting element;
    a second lens system configured to receive an image data stream on the first light path from the light splitting element, the image data stream comprising a sequence of image frames having an image frame period; and
    a third lens system configured to receive the image data stream on the second light path from the polarization rotator element, wherein the first and second illumination sources are configured for modulation at a rate equivalent to the image frame period.

11. The polarization conversion system of claim 10, further comprising:
    at least one active iris configured to perform, at least in part, the modulation.

12. The polarization conversion system of claim 11, wherein a first active iris is in the initial light path.

13. The polarization conversion system of claim 11, wherein a first active iris is in either the first light path or the second light path.

14. The polarization conversion system of claim 13, wherein the first active iris is in the first light path, the polarization conversion system further comprising:
    a second active iris in the second light path, the second active iris configured to perform, at least in part, the modulation; and
    a third active iris in the initial light path, the third active iris configured to perform, at least in part, the modulation.

15. A projection system having an illumination path and an imaging path, the projection system comprising:
    a first illumination source having a first numerical aperture value;
    a second illumination source having a second numerical aperture value lower than the first numerical aperture value;
    a homogenizer component in the illumination path, the homogenizer component configured to receive light from both the first and second illumination sources;
    a projection lens in the imaging path, the projection lens configured to receive an image data stream, the image data stream comprising a sequence of image frames having an image frame period, wherein the first and second illumination sources are configured for modulation at a rate equivalent to the image frame period; and
    an active iris configured to perform, at least in part, the modulation, wherein the active iris is deployed at a pupil position in an imaging path relay.

16. The projection system of claim 15, wherein the modulation is at least one of intensity modulation and area modulation.

17. The projection system of claim 15, wherein the modulation is based on an electronic preview of an image frame.

18. The projection system of claim 15, wherein the modulation is based on metadata associated with an image frame.

19. The projection system of claim 15, wherein the first and second illumination sources are configured for non-uniform modulation.

20. A projection system having an illumination path and an imaging path, the projection system comprising:
- a first illumination source having a first numerical aperture value;
- a second illumination source having a second numerical aperture value lower than the first numerical aperture value;
- a homogenizer component in the illumination path, the homogenizer component configured to receive light from both the first and second illumination sources;
- a projection lens in the imaging path, the projection lens configured to receive an image data stream, the image data stream comprising a sequence of image frames having an image frame period, wherein the first and second illumination sources are configured for modulation at a rate equivalent to the image frame period; and
- an active iris configured to perform, at least in part, the modulation, wherein the active iris is deployed in the projection lens.

21. The projection system of claim 20, wherein the modulation is at least one of intensity modulation and area modulation.

22. The projection system of claim 20, wherein the modulation is based on an electronic preview of an image frame.

23. The projection system of claim 20, wherein the modulation is based on metadata associated with an image frame.

24. The projection system of claim 20, wherein the first and second illumination sources are configured for non-uniform modulation.

* * * * *